United States Patent
Redaelli et al.

(10) Patent No.: US 7,641,576 B2
(45) Date of Patent: Jan. 5, 2010

(54) REVERSIBLE LOCKING DEVICE FOR A TIMING CHAIN TENSIONER

(75) Inventors: Daniele Redaelli, Lecco (IT); Lorenzo Caprotti, Milan (IT); Emanuele Arosio, Milan (IT)

(73) Assignee: Morse TEC Europe, S.R.L., Milan (IT)

( * ) Notice: Subject to any disclaimer, the term of this patent is extended or adjusted under 35 U.S.C. 154(b) by 411 days.

(21) Appl. No.: 11/421,090

(22) Filed: May 31, 2006

(65) Prior Publication Data
US 2007/0021251 A1    Jan. 25, 2007

(30) Foreign Application Priority Data
Jul. 25, 2005   (EP)   ................... 05425542

(51) Int. Cl.
*F16H 7/08*   (2006.01)
(52) U.S. Cl. ...................... 474/109; 474/110
(58) Field of Classification Search ............. 470/149, 470/6; 474/109, 110; 411/422
See application file for complete search history.

(56) References Cited

U.S. PATENT DOCUMENTS

| 72,013 | A * | 12/1867 | Gardner | 411/373 |
|---|---|---|---|---|
| 3,426,606 | A | 2/1969 | Hopkins | |
| 4,948,315 | A | 8/1990 | Limberis | |
| 5,160,225 | A * | 11/1992 | Chern | 411/30 |
| 5,246,404 | A * | 9/1993 | Ojima | 474/111 |
| 5,308,203 | A * | 5/1994 | McSherry et al. | 411/31 |
| 5,601,505 | A | 2/1997 | Tada | |
| 5,676,614 | A | 10/1997 | Inoue et al. | |
| 5,782,625 | A * | 7/1998 | Young | 474/138 |
| 6,093,123 | A * | 7/2000 | Baddaria et al. | 474/110 |
| 6,422,964 | B1 | 7/2002 | Rointru et al. | |
| 6,817,958 | B2 * | 11/2004 | Kaido et al. | 474/101 |
| 6,916,264 | B2 * | 7/2005 | Hashimoto et al. | 474/109 |
| 7,077,772 | B2 * | 7/2006 | Hashimoto et al. | 474/109 |

FOREIGN PATENT DOCUMENTS

DE          7809294 U1    1/1979

* cited by examiner

*Primary Examiner*—Robert A Siconolfi
*Assistant Examiner*—Stephen Bowes
(74) *Attorney, Agent, or Firm*—Brown & Michaels, PC (57) ABSTRACT

A reversible locking device 1 for a tensioner 100 of a timing chain 20 includes a locking device body 3, integral with the tensioner 100 and protruding with respect to the body of the tensioner 100, which has a shaped slot 2. A perforated protrusion 4 is integral with the shoe 5 carried by the piston 6 and protrudes with respect to the shoe 5 so that its hole is aligned with the shaped slot. A rod 7 has a first part 8 with a shape complementary to that of the shaped slot 2 and a second part 9 bearing at one end a conical portion 10 adapted to couple it irreversibly to the perforated protrusion 4 integral with the shoe 5.

22 Claims, 5 Drawing Sheets

REVERSIBLE LOCKING DEVICE FOR A TIMING CHAIN TENSIONER

REFERENCE TO RELATED APPLICATIONS

This application claims an invention, which was disclosed in European application number 05 425 542.7, filed Jul. 25, 2005, entitled "REVERSIBLE LOCKING DEVICE FOR A TIMING CHAIN TENSIONER". The benefit under 35 USC§119(a) of the European application is hereby claimed, and the aforementioned application is hereby incorporated herein by reference.

BACKGROUND OF THE INVENTION

1. Field of the Invention

The invention pertains to the field of tensioners. More particularly, the invention pertains to locking devices for timing chain tensioners.

2. Description of Related Art

The timing system of an internal combustion engine may be controlled by a chain transmission, in which the chain is wound on two or more sprockets, one of which is a drive sprocket and takes its drive (even indirectly) from the drive shaft to transmit it, by means of the chain and of one or more driven sprockets, to one or more driven shafts.

Since for reasons of adjustment, wear of materials and/or of take-up of the slack, it is often necessary to compensate for a certain slack on the chain, shoe-type tensioning devices are known in the art. In these tensioners, a shoe is biased with an adjustable force against a strand of the chain, generally known as the "slack strand".

The most frequently used tensioning devices are hydraulic or mechanical tensioners, in which a fixed element (generally a cylinder) is mounted on the engine block and a moveable element (generally a piston, moveable inside the cylinder) is slideable with respect to the fixed element and acts against the shoe placed in contact with the chain to tension it.

In these tensioning devices, the piston is biased out of the cylinder, towards the shoe disposed against a strand of the chain, by the action of a spring placed inside the cylinder.

When the tensioner is not installed, for example during transport and/or during possible replacement, the spring biases the piston (often with considerable force) out of the cylinder. To overcome this drawback, ways to lock the piston mechanically inside the cylinder at least during the transport of the tensioner have been developed (for example, a pin inserted in a through hole formed in the body of the piston and in a pair of holes made in the wall of the cylinder and aligned with the through hole formed in the piston).

This locking mechanism presents a serious drawback in that, when it is removed, the spring may violently expel the piston from the cylinder. This may make the installation of the tensioner difficult and may represent a source of danger for those carrying out the operation.

Furthermore, it is practically impossible, or at the very least, difficult and laborious, to re-install the locking mechanism before removing the tensioner for any reason including, but not limited to, carrying out the maintenance and/or the replacement of the tensioner and/or of the chain. The typically awkward position of the tensioner and the action of the spring on the piston may make this operation a source of danger for those carrying it out.

SUMMARY OF THE INVENTION

A reversible locking device for a tensioner of a timing chain includes a locking device body, integral with the tensioner and protruding with respect to the body of the tensioner, which has a shaped slot, a perforated protrusion integral with the shoe carried by the piston and protruding with respect to the shoe so that its hole is aligned with the shaped slot, and a rod, having a first part with a shape complementary to that of the shaped slot and a second part bearing at one end means adapted to couple it irreversibly to the perforated protrusion integral with the shoe.

The locking device is disabled by rotating the rod to allow the second part of the rod to pass through the shaped slot present in the locking device body.

The rod is preferably made of plastic material, the perforated protrusion is preferably made of the plastic material used to make or to coat the shoe and the locking device body is preferably made in one piece with the tensioner from a metal material. Alternatively, the locking device body is made of a plastic material and applied to the tensioner.

The second part of the rod is preferably cylindrical and bears at one end a conical portion designed to be inserted irreversibly in the hole of the protrusion, while the first part of the rod has means to limit the stroke in the shaped slot when the tensioner is disabled and the chain is slack.

In an alternative embodiment, the locking device body with the shaped slot is integral with the shoe and is made of the plastic material used to make or to coat the shoe and the perforated protrusion is integral with the tensioner.

DETAILED DESCRIPTION OF THE INVENTION

The present invention refers to a device, made at least partially of plastic material, designed to reversibly lock a tensioner intended to tension the chain of the timing system of an engine, in particular an internal combustion engine.

The present invention is a reversible locking device. The locking device is free from the limits and defects of the prior art since it remains connected to the tensioner even when the tensioner is installed. It allows the tensioner to be locked again, if necessary, and it limits the stroke of the piston with respect to the cylinder, avoiding the expulsion seen in the prior art.

The invention will now be described with reference to an exemplifying embodiment, illustrated in the figures. In the figures, like elements will be denoted by the same reference numerals.

In the embodiment described herein, the locking device is combined with a hydraulic tensioner but the locking device may alternatively be combined with another type of tensioner, including, but not limited to, a mechanical tensioner.

The locking device 1 shown in the figures includes a locking device body 3, which has a shaped slot 2. The locking device body 3 is integral with the tensioner 100 and protrudes with respect to the body of the tensioner 100. The locking device 1 also includes a perforated protrusion 4, integral with the shoe 5 carried by the piston 6 (see FIGS. 8 and 9) and protruding with respect to the shoe 5 so that the hole is aligned with that of the shaped slot 2. The locking device 1 also includes a rod 7 that has a first part 8 with a shape complementary to that of the shaped slot 2 and a second part 9 bearing at the end means 10 designed to couple it irreversibly with the perforated protrusion 4 integral with the shoe 5.

The rod 7 is preferably made of plastic material and the perforated protrusion 4 is preferably made of the plastic material used to make or to coat the shoe 5. The locking device body 3 is preferably made in one piece with the body of the tensioner 100 and is preferably made of a metal material or of an aluminium alloy. Alternatively, the locking device body 3 may be made of a plastic material and applied to the tensioner 100.

The first part 8 of the rod 7 has means 11 designed to limit the stroke in the shaped slot 2, when the tensioner 100 is disabled. The stroke of the first part 8 in the shaped slot 2 is preferably greater than the stroke of the piston 6 when the tensioner 100 is disabled and the chain 20 (see FIG. 5) is slack.

The second part 9 of the rod 7 is preferably cylindrical, bears at one end a conical portion 10 designed to be inserted irreversibly in the hole 4 and has a length that is equal to or slightly greater than the length of the tensioner 100 in transport conditions, which occurs when the piston 6 is almost completely withdrawn inside the cylinder.

Figure 1:
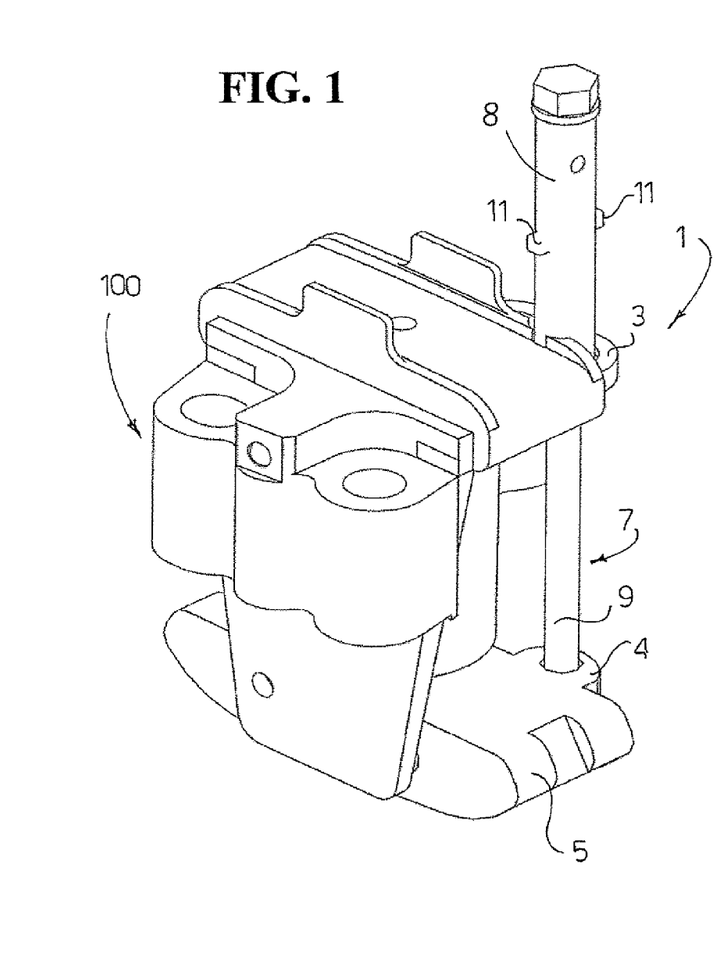
FIG. 1 shows diagrammatically a perspective view of a tensioner locked for transport by a locking device of the present invention.

FIG. 1 shows diagrammatically a perspective view of the tensioner 100 locked for transport by a locking device 1 of the present invention. More specifically, FIG. 1 shows the locking device body 3, integral with the tensioner 100, bearing the shaped slot 2 (seen better in FIG. 3). The perforated protrusion 4 is integral with the shoe 5 and protrudes with respect to the shoe so that its hole is aligned with the shaped slot 2. The rod 7 has a first part 8 with a shape preferably complementary to that of the shaped slot 2. The rod 7 also has a second part 9 (which is preferably cylindrical) which bears at one end the conical portion 10 (see FIG. 2) designed to couple it irreversibly to the perforated protrusion 4 of the shoe 5. The two parts 8, 9 of the rod 7 are advantageously joined to each other by a surface 12 (FIG. 2) which rests against the locking device body 3 when the tensioner 100 is locked. A pair of protrusions 11 (diametrically opposed and having a greater length than the major axis of the shaped slot 2) present on the first part 8 of the rod 7 constitute the means to limit (as will be illustrated with reference to FIGS. 8 and 9) the stroke of the first part 8 in the shaped slot 2 when the locking device 1 is disabled. The stroke is preferably greater than the maximum stroke of the piston 6 when the locking device 1 is disabled.

Figure 2:
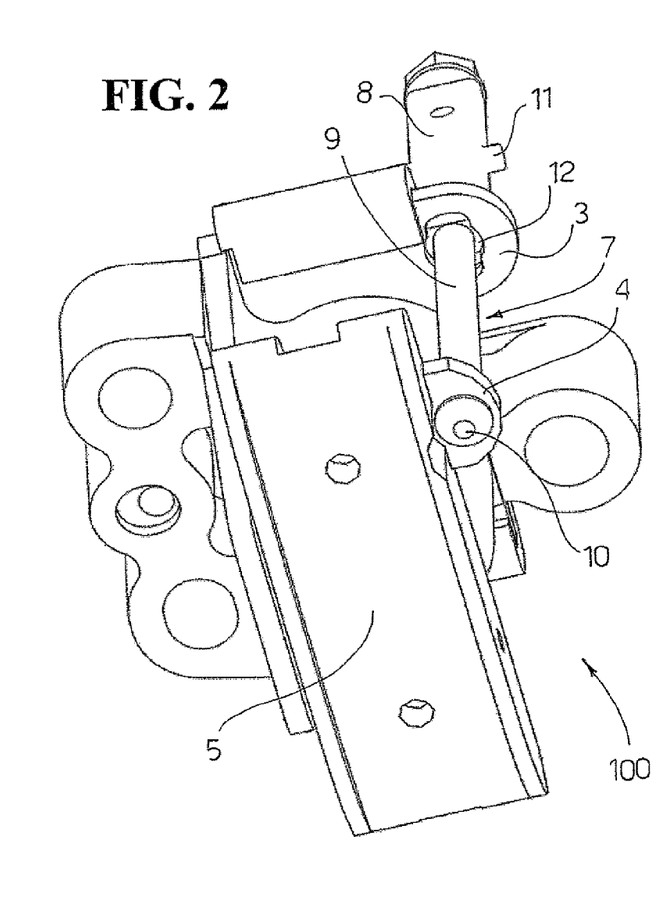
FIG. 2 shows diagrammatically a perspective bottom view of the tensioner and of the locking device of FIG. 1.

FIG. 2 shows diagrammatically a perspective bottom view of the tensioner 100 and of the locking device 1 of FIG. 1. FIG. 2 clearly shows the locking device body 3 with the shaped slot 2 and the conical portion 10 situated at the end of the part 9 of the rod 7 and designed to be inserted irreversibly in the hole of the protrusion 4. As shown in FIG. 2, the rod extends through the shaped slot of the locking device body and through the hole of the perforated protrusion when the tensioner is locked by the locking device.

The joining surface 12 between the first and the second part 8, 9 of the rod 7, which rests against the locking device body 3, prevents the spring of the tensioner 100 from biasing the piston 6 out of the cylinder, which can be seen through the slot 2.

Figure 3:
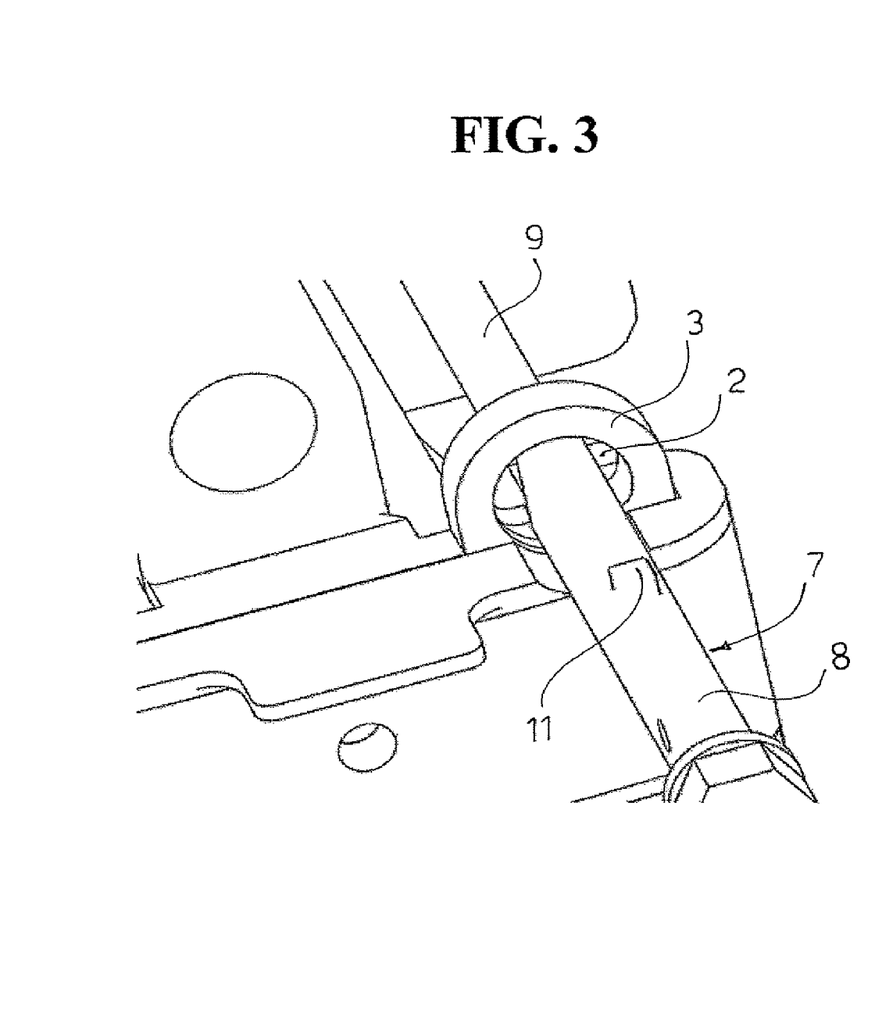
FIG. 3 shows diagrammatically enlarged details of the locking device of FIG. 1.

FIG. 3 shows diagrammatically some enlarged details of the locking device 1 of FIG. 1. FIG. 3 shows the locking device body 3 bearing the shaped slot 2, the first part 8 of the rod 7, with the protrusions 11 (only one of which is visible in FIG. 3) and rotated so that the joining surface 12 rests against the locking device body 3, and a portion of the second part 9 of the rod 7.

Figure 4:
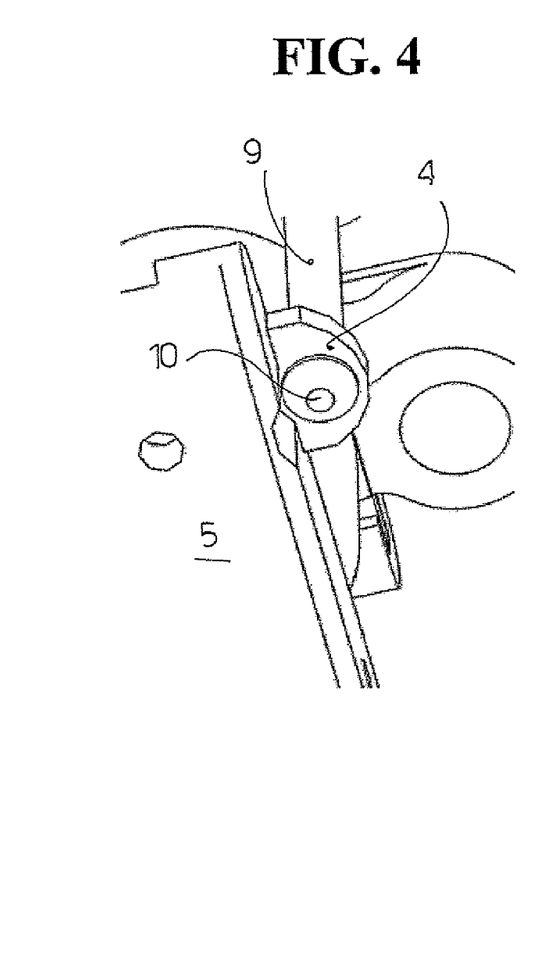
FIG. 4 shows diagrammatically other enlarged details of the locking device of FIG. 1.

FIG. 4 shows diagrammatically, enlarged, the conical portion 10 situated at the end of the part 9 of the rod 7 and engaged irreversibly in the hole present in the protrusion 4 integral with the shoe 5.

Figure 5:
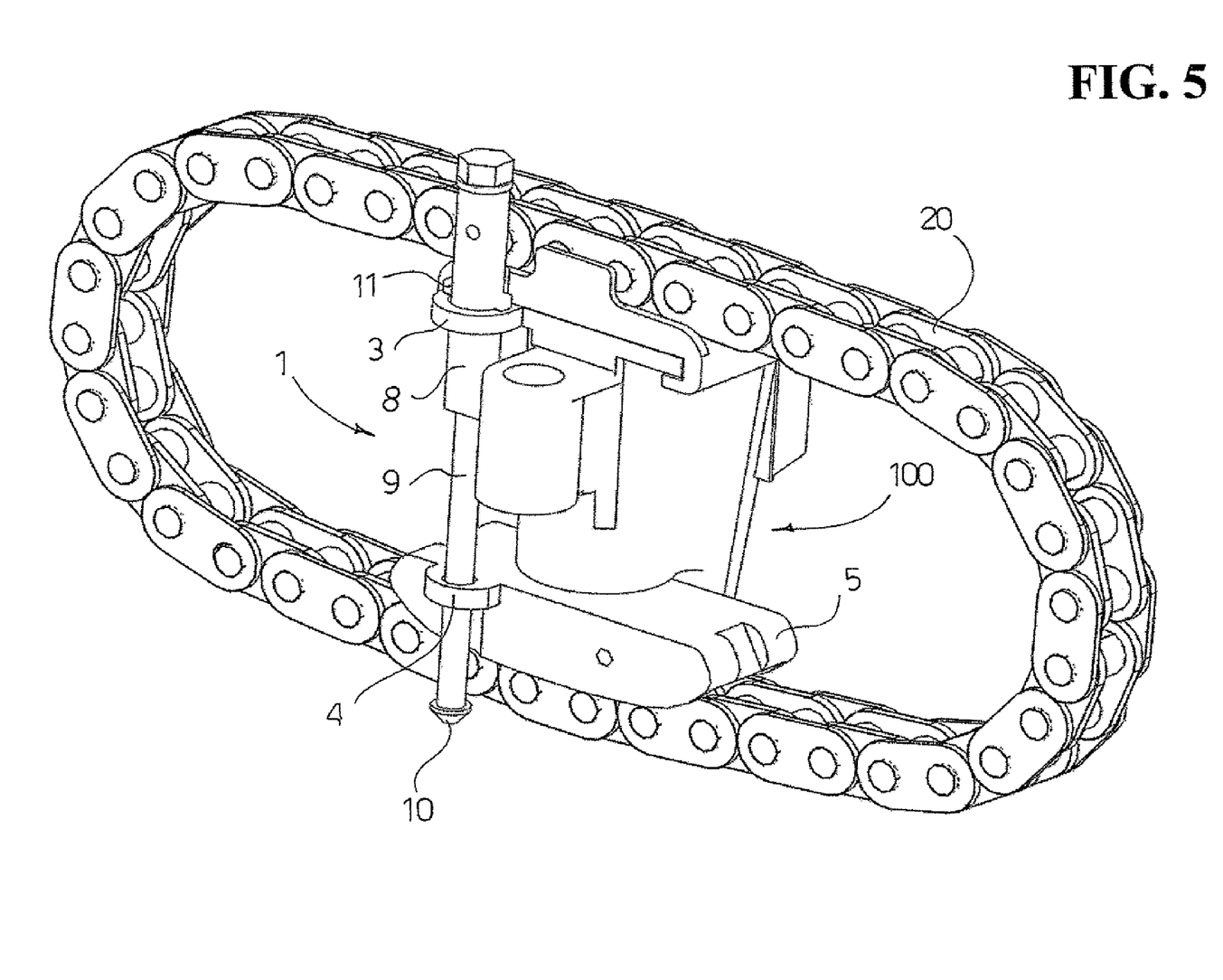
FIG. 5 shows diagrammatically a perspective view of the tensioner, inserted in a timing chain, with the locking device disabled.

FIG. 5 shows diagrammatically a perspective view of the tensioner 100, inserted in the chain 20, in which the locking device 1 has been disabled by rotating the rod 7 to allow the second part 9 of the rod 7 to pass through the shaped slot 2 present in the locking device body 3. As shown in FIG. 5, the rod extends through the shaped slot of the locking device body and through the hole of the perforated protrusion when the locking device is disabled.

Figure 6:
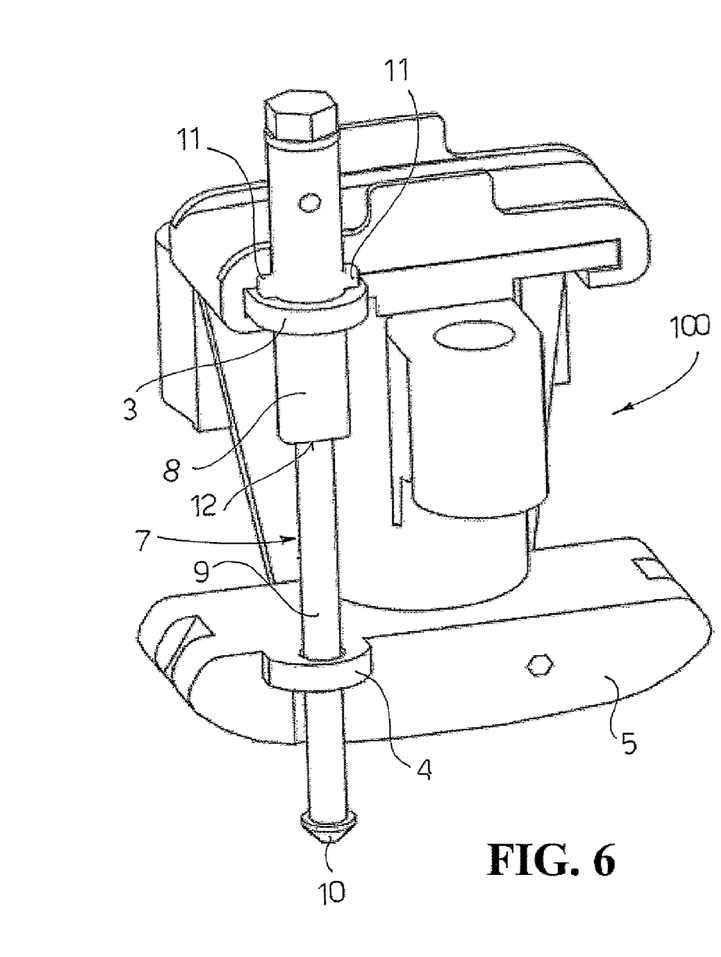
FIG. 6 shows diagrammatically a perspective view of the tensioner of FIG. 5, in which the chain has been omitted.
Figure 7:
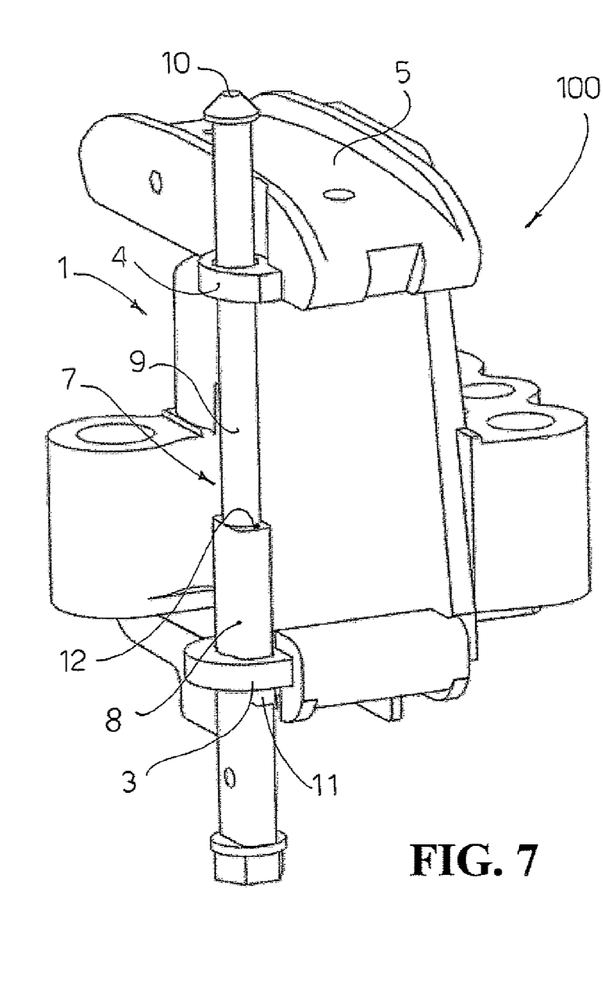
FIG. 7 shows diagrammatically another perspective view (rotated 180°) of the tensioner of FIG. 6.

Normally, if the chain 20 is not slack because of wear, the piston 6 tensions the chain 20, which rests on the shoe 5, protruding very little (as shown in FIGS. 5-7) from the cylinder of the tensioner 100. In FIG. 5, the protrusions 11 rest on the locking device body 3 which bears the shaped slot 2 while the conical portion 10 is not in contact with the perforated protrusion 4. Alternatively, the protrusions 11 may be raised with respect to the locking device body 3 while the conical portion 10 is in contact with the perforated protrusion 4 or the rod 7 is in an intermediate position between the two positions previously described.

The locking device 1 does not interfere with the movements of the piston 6 (and of the shoe 5, integral therewith) during normal operation of the chain 20 tensioned by the tensioner 100 or with the operation of the chain 20.

For simplicity of the graphic representation, FIG. 5 omits the sprockets (drive and idle) on which the chain 20 is wound.

FIG. 6 shows diagrammatically a perspective view of the tensioner 100 of FIG. 5, in which the chain 20 has been omitted for simplicity of the graphic representation.

FIG. 6 shows the tensioner 100, the first part 8 of the rod 7 whose protrusions 11 rest on the locking device body 3, the joining surface 12 between the first and the second part 8, 9 of the rod 7 and the second part 9 of the rod 7, whose conical portion 10 is not in contact with the perforated protrusion 4.

FIG. 7 shows diagrammatically another perspective view (rotated 180° with respect to that of FIG. 6) of the tensioner 100 of FIG. 6, with the locking device 1 disabled.

Figure 8:
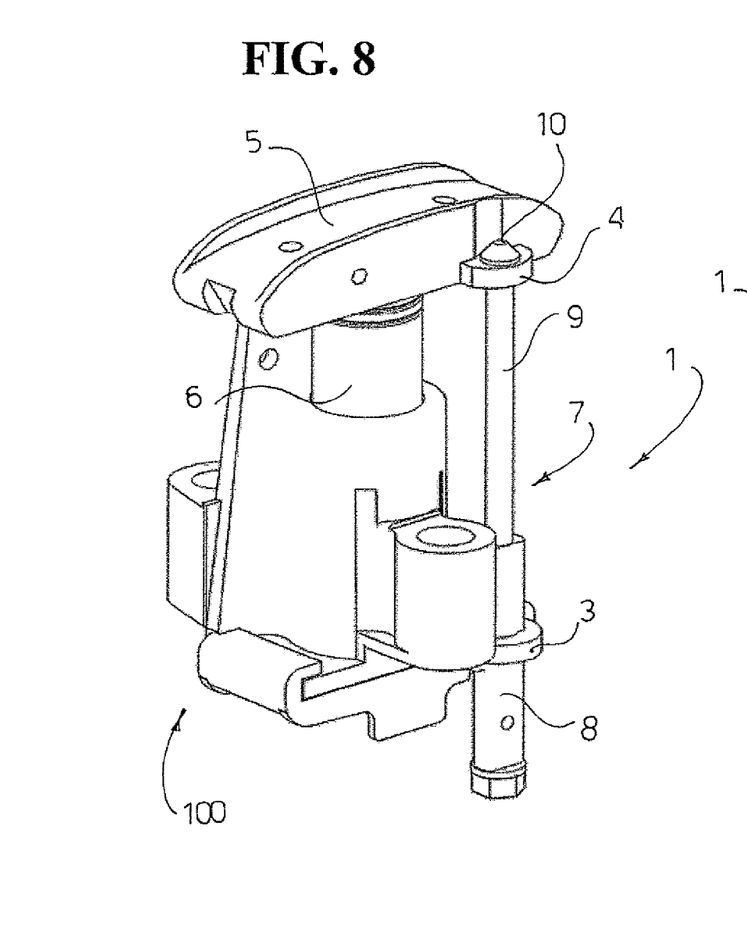
FIG. 8 shows diagrammatically a perspective view of the tensioner of FIG. 5 when the chain has a lot of slack.
Figure 9:
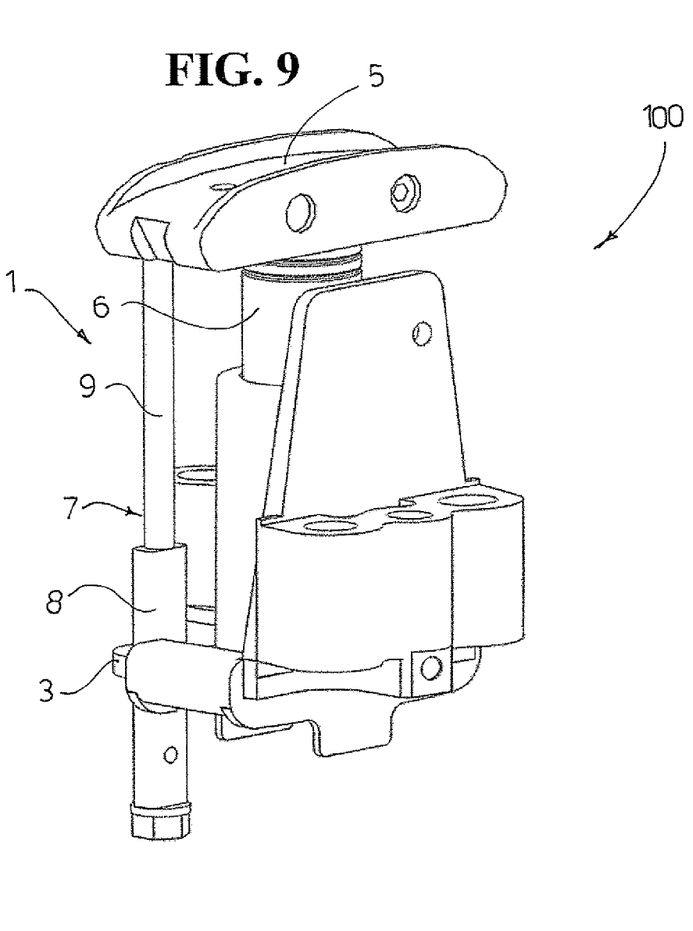
FIG. 9 shows diagrammatically another perspective view of the tensioner of FIG. 5 when the chain has a lot of slack.

FIGS. 8 and 9 show diagrammatically two perspective views of the tensioner 100 of FIG. 5 in which the locking device 1 prevents the piston 6 from coming out of the cylinder completely when the chain 20 has a lot of slack, for example due to wear.

As shown in FIGS. 8 and 9, to compensate for the slack on the chain 20, the piston 6 gradually goes out of the cylinder. The stroke of the piston 6, when the tensioner 100 is disabled and the chain 20 is slack, is limited by the protrusions 11 of the first part 8 of the rod 7 which rest on the locking device body 3 and by the conical portion 10 situated at the end of the second part 9 of the rod 7, which is in contact with the perforated protrusion 4.

The locking device 1 is a reversible device since, if the tensioner 100 has to be removed, it is possible to lock the device 1 again by exerting traction on the end of the first part 8 of the rod 7 to cause the first part 8 to leave the shaped slot 2 and by rotating the rod to make the joining surface 12 of the rod 7 to rest against the locking device body 3, returning the tensioner 100 to the transport condition (FIGS. 1 and 2).

In other embodiments, the locking device body 3 with the shaped slot 2 may be integral with the shoe 5 and may be made of the plastic material used to make or to coat the shoe 5, the perforated protrusion 4 may be integral with the tensioner 100 and the rod 7 is rotated 180° with respect to the positions shown in the figures.

Without departing from the scope of the invention, a person skilled in the art may make to the reversible locking device of the present invention all those changes and improvements which are suggested by experience or by the natural evolution of the art.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A reversible locking device (1) for a tensioner (100) including a tensioner body, a shoe (5), and a tensioner piston (6), the reversible locking device comprising:
    a locking device body (3) having a shaped slot (2), wherein the locking device body (3) is integral with the tensioner (100) and protrudes with respect to the tensioner body;
    a perforated protrusion (4) defining a hole, formed integrally with the shoe (5) carried by the tensioner piston (6) and protruding with respect to the shoe (5) such that the hole of the perforated protrusion is aligned with the shaped slot (2) of the locking device body; and
    a rod (7) having a first part (8) with a shape complementary to that of the shaped slot (2) and a second part (9) with a first end coupled with the perforated protrusion (4);
    wherein the locking device is reversibly lockable; and
    wherein the locking device is retained on the tensioner when the tensioner is locked by the locking device and when the locking device is disabled, wherein the rod extends through the shaped slot of the locking device body and through the hole of the perforated protrusion when the tensioner is locked by the locking device and when the locking device is disabled.

2. The reversible locking device of claim 1, wherein the rod (7) is made of a plastic material.

3. The reversible locking device of claim 1, wherein the perforated protrusion (4) is made of a plastic material that is the same as a plastic material used to make or to coat the shoe (5).

4. The reversible locking device of claim 1, wherein the locking device body (3) is made in one piece with the tensioner body.

5. The reversible locking device of claim 1, wherein the locking device body (3) is made of a plastic material and applied to the tensioner (100).

6. The reversible locking device of claim 1, wherein the second part (9) of the rod (7) includes a conical portion (10).

7. The reversible locking device of claim 6, wherein a joining surface (12) between the first part (8) and the second part of the rod (7) contacts the locking device body (3) and the conical portion contacts the perforated protrusion to limit a stroke of the piston when the tensioner (100) is locked.

8. The reversible locking device of claim 6, wherein the first part (8) of the rod (7) comprises a pair of protrusions (11).

9. The reversible locking device of claim 8, wherein the protrusions are diametrically opposed and of a greater length than a major axis of the shaped slot (2), and a stroke of the first part (8) of the rod in the shaped slot (2) when the reversible locking device is disabled is limited by the protrusions (11) and the conical portion and is greater than a stroke of the piston (6) when the chain (20) is slack.

10. The reversible locking device of claim 8, wherein a stroke of the piston (6) is limited by the protrusions (11) resting on the locking device body (3) and by the conical portion (10) contacting the perforated protrusion (4) when the locking device is disabled.

11. The reversible locking device of claim 1, wherein the locking device is disabled by rotating the rod (7) and allowing the second part (9) of the rod (7) to pass through the shaped slot (2).

12. The reversible locking device of claim 1, wherein the locking device (1) is formed such that exerting traction on the end of the first part (8) of the rod (7) such that the first part (8) leaves the shaped slot (2) and rotating the rod (7) such that a joining surface (12) of the rod (7) rests against the body (3) locks the locking device.

13. A reversible locking device (1) for a tensioner (100) including a tensioner body, a shoe (5), and a tensioner piston (6), the reversible locking device comprising:
    a locking device body (3) having a shaped slot, wherein the locking device body is integral with the shoe (5) carried by the tensioner piston (6) and protrudes with respect to the shoe (5);
    a perforated protrusion (4) defining a hole, formed integrally with the tensioner body and protruding with respect to the tensioner body such that the hole of the perforated protrusion is aligned with the shaped slot (2) of the locking device body;
    a rod (7) having a first part (8) with a shape complementary to that of the shaped slot (2) and a second part (9) with a first end coupled with the perforated protrusion (4);
    wherein the locking device is reversibly lockable; and
    wherein the locking device is retained on the tensioner when the tensioner is locked by the locking device and when the locking device is disabled, wherein the rod extends through the shaped slot of the locking device body and through the hole of the perforated protrusion when the tensioner is locked by the locking device and when the locking device is disabled.

14. The reversible locking device of claim 13, wherein the tensioner is used in a timing chain.

15. The reversible locking device of claim 13, wherein the rod (7) is made of a plastic material and the locking device body (3) is made of the plastic material used to make or to coat the shoe (5).

16. The reversible locking device of claim 13, wherein the second part (9) of the rod (7) includes a conical portion (10).

17. The reversible locking device of claim 16, wherein a joining surface (12) between the first part (8) and the second part of the rod (7) contacts the locking device body (3) and the conical portion contacts the perforated protrusion to limit a stroke of the piston when the tensioner (100) is locked.

18. The reversible locking device of claim 16, wherein the first part (8) of the rod (7) comprises a pair of protrusions (11).

19. The reversible locking device of claim 18, wherein the protrusions are diametrically opposed and of a greater length than a major axis of the shaped slot (2), and a stroke of the first part (8) of the rod in the shaped slot (2) when the reversible locking device is disabled is limited by the protrusions (11) and the conical portion and is greater than a stroke of the piston (6) when the chain (20) is slack.

20. The reversible locking device of claim 18, wherein a stroke of the piston (6) is limited by the protrusions (11) resting on the locking device body (3) and by the conical portion (10) contacting the perforated protrusion (4) when the locking device is disabled.

21. The reversible locking device of claim 13, wherein the locking device is disabled by rotating the rod (7) and allowing the second part (9) of the rod (7) to pass through the shaped slot (2).

22. The reversible locking device of claim 13, wherein the locking device (1) is formed such that exerting traction on the end of the first part (8) of the rod (7) such that the first part (8) leaves the shaped slot (2) and rotating the rod (7) such that a joining surface (12) of the rod (7) rests against the body (3) locks the locking device.

* * * * *

UNITED STATES PATENT AND TRADEMARK OFFICE
CERTIFICATE OF CORRECTION

PATENT NO.        : 7,641,576 B2                                     Page 1 of 1
APPLICATION NO.   : 11/421090
DATED             : January 5, 2010
INVENTOR(S)       : Redaelli et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 428 days.

Signed and Sealed this

Sixteenth Day of November, 2010

David J. Kappos
*Director of the United States Patent and Trademark Office*